Aug. 12, 1952  H. FIELD, JR  2,606,539
VALVE CONTROL FOR ENGINE COOLING SYSTEMS
Filed May 27, 1946

INVENTOR:
HOWARD FIELD JR.,
By HARRIS, KIECH, FOSTER & HARRIS,
FOR THE FIRM
ATTORNEYS

Patented Aug. 12, 1952

2,606,539

UNITED STATES PATENT OFFICE 2,606,539

VALVE CONTROL FOR ENGINE COOLING SYSTEMS

Howard Field, Jr., Los Angeles, Calif.

Application May 27, 1946, Serial No. 672,367

24 Claims. (Cl. 123—41.29)

This invention relates to an automatic shut-off valve adapted for use in fluid circulating systems or in systems including hydraulically actuated devices.

The present invention is particularly adapted for use in engine cooling systems which include an engine driven pump for circulating hot water from an engine to a cooling radiator and drawing cool water from said radiator to said engine for cooling purposes. While the invention is hereinafter described in connection with such a coolant circulating system it will be obvious that the improved shut-off valve is applicable to other systems and I do not wish to be limited to the exact embodiment disclosed. The present invention is concerned particularly with an automatic shut-off valve to be used in an engine coolant circulating system having a primary line extending from the engine pump to a radiator and a return line extending from the radiator back to the engine. This, briefly, is the type of cooling system used in automotive vehicles and in aircraft. Occasionally the coolant lines of an aircraft engine will break accidentally or will be broken or severed by gun fire or for other reasons. My automatic shut-off valve is included in the cooling system in such a manner that both the primary flow and return flow pass through my valve. If any lines become broken or severed between my shut-off valve and the cooling radiator, then my valve will automatically operate to prevent the loss of fluid in the flow lines. It is also within the concept of my invention to so connect the improved shut-off valve to a selector valve that simultaneous with the shutting off of the flow of coolant to the radiator the flow of coolant is diverted to an auxiliary radiator. When the shut-off valve is employed in a hydraulic system the primary flow of the hydraulic actuating devices and the return flow from such devices back to the pump pass through my valve.

An object of my invention is to provide a novel automatic shut-off valve of the character referred to which is controlled by the flow of fluid in the return line and if there is no flow of fluid in this return line, the valve remains closed and the pump cannot force fluid through such lines causing the fluid to be lost.

Another object is to provide a novel automatic shut-off valve having a primary passage and a return passage and valve members in said passages, said valve members being responsive to continuous flow through both passages to maintain both passages open but adapted to respond to a decrease in flow through said return passage to close both passages, thereby preventing loss of fluid due to leaks in the radiator or hydraulic actuator or in the lines connected thereto.

Another object is to provide in an automatic shut-off valve of the type indicated, a novel and ingenious means for connecting the valve members for simultaneous movement to open or closed positions whereby the rate of flow of fluid through the primary passage in excess of the rate of flow through said return passage will act to close both valve members to insure against loss of fluid, the valve members remaining in closed position until flow is established in the return line.

Another object is to provide a valve of the type specified in which only a limited amount of fluid is permitted to flow in the primary line until flow is established in the return line.

Another object is to provide an automatic shut-off valve in which interconnected poppet type valve members are employed and in which the poppet located in the primary passage serves to prevent flow through the primary line until said poppet is unseated by the flow in the return line reacting against the poppet located in the return passage, said poppet valves being adapted to open due to expansion of fluid or the development of excessive pressure in the radiator or other fluid device due to obstructions or other causes.

Another object is to provide in a valve of the type referred to a manual resetting means which may be operated in order to clear the lines and to test them and also to initially reset the valve to establish flow of fluid through the valve.

A further object is to provide a valve of the type indicated in which the poppet type valve members may be carried by a coaxial stem to simplify the construction.

A further object is to provide a shut-off valve of the type referred to which may be advantageously used in conjunction with a selector valve which functions, when the shut-off valve is closed, to divert the flow of fluid to an auxiliary radiator or other device whereby to prevent rupturing of the lines due to excessive pressure developed therein by the fluid pump.

A still further object is to provide an automatic shut-off valve which is simple in construction, inexpensive to manufacture and especially efficient in performing its intended function.

Other objects, advantages, and features of invention will appear from the accompanying drawing, the subjoined detailed description and the appended claims. Referring to the drawing, which is for illustrative purposes only:

Figures 1, 2, 3, 4:
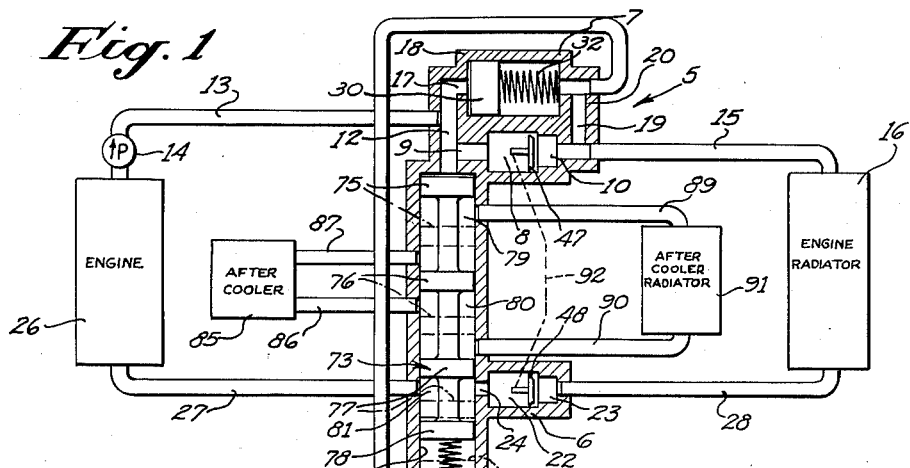
Fig. 1 is a diagrammatic view showing my improved automatic shut-off valve incorporated in the cooling system of an aircraft engine.
Fig. 2 is a vertical sectional view of my shut-off valve.
Fig. 3 is a cross-sectional view through the shut-off valve taken on line 3—3 of Fig. 2.
Fig. 4 is a vertical sectional view of a shut-off valve of modified construction.

In the specification and appended claims the term "pressure" is to be construed as meaning "pressure per unit of area."

Referring more particularly to Figs. 2 and 3 of the drawing, my shut-off valve 5 includes a valve body 6 and a cylinder 7 which may be an integral part of the body 6 or may be in the form of a sleeve held in place as herein shown. The valve body 6 is provided with a primary passage 8 including a primary inlet port 9 and a primary outlet port 10. The primary inlet port 9 is in fluid communication with a passage 12 into which the primary flow line 13 from the engine-driven pump 14 extends, as diagrammatically shown in Fig. 1. The primary outlet port 10 is connected by a line 15 to a cooling radiator 16 as indicated diagrammatically in Fig. 1. A relatively short duct 17 connects one end 18 of the cylinder 7 to the passage 12 and a similar duct 19 communicates between the other end 20 of the cylinder and the primary outlet port 10, the purpose of these ducts being subsequently explained.

The valve body 6 is also provided with a return passage, indicated generally by the reference character 22, which extends parallel to the primary passage 8. The return passage 22 includes a return inlet port 23 and a return outlet port 24, the latter port communicating with a passage 25 which may be connected to the aircraft engine 26 by means of a line 27 (Fig. 1). The return inlet port 23 is connected to the outlet side of the engine radiator 16 by a line or pipe 28 (Fig. 1).

Arranged for axial sliding movement in the cylinder 7 is a piston member 30. As shown in Fig. 2, the piston member 30 is of hollow construction and compressed between the end wall of the piston and a ledge 31 within the cylinder is a coil spring 32 serving to normally maintain the piston in the end 18 of the cylinder. Fluid passing through the valve 5 to the radiator 16 is adapted to flow through the duct 19 into the cylinder 7 to substantially fill the same for a purpose to be later explained.

The wall or partition 35 which separates the two passages 8 and 22 is formed with a pair of oppositely extending bearing bosses 36 and 37 which are disposed within the passages 8 and 22, respectively, and a bore extends between the bosses and through the wall 35 to receive a shaft 38 (Figs. 2 and 3). The shaft 38 is provided with gear teeth 39 at its ends and also with a pinion 40 midway between its ends. Formed integral with the bearing bosses 36 and 37 are right angular slide bearings 42 and 43 having bores for receiving the stems 45 and 46 of a primary valve member 47 and a return valve member 48. The valve stems 45 and 46 are provided with rack teeth 49 adapted to mesh with the gear teeth 39 at the ends of the shaft 38 (Fig. 3).

The valve members 47 and 48 are constructed in the form of poppet valves, having poppet heads 50 and 51, respectively, which are adapted to be engaged with annular valve seats 52 and 53 to shut off the flow of fluid through the passages 8 and 22. The valve seats 52 and 53 may have resilient inserts 54 if desired.

It will be apparent from the foregoing that the valve members 47 and 48 are responsive to and their operation dependent upon the flow of fluid through the respective passages 8 and 22 in which they operate. That is to say, the flow of fluid through the passages 8 and 22 reacts or impinges against the heads 50 and 51 to either engage or disengage said heads from the valve seats 52 and 53. For example, when the rate of flow of fluid is equal in both passages 8 and 22 the force of the outgoing and incoming fluid will be equal and therefore both valve heads 50 and 51 will be held away from the seats 52 and 53 to permit continuous circulation of fluid through the radiator 16. However, if a leak should occur in the radiator 16 or return line 28 the rate of fluid flow through the primary passage 8 will increase to a value in excess of the flow through the return passage 22 and thus the valve member 47 will be forced against its seat 52. As the valve member 47 is moved against the seat 52 its rack teeth 49 which mesh with the gear teeth 39 of the shaft 38 to rotate the shaft in a direction to cause it to simultaneously move the other valve member 48 in the same direction to cause its head 51 to engage against the seat 53 to close the return passage 22.

The partition or wall 35 of the valve body 6 is provided with a bore 56 in which a manually operable rod 57 is adapted to slide and an enlarged bore 58 extending coaxial with the bore 56 and in which a plunger 59 is arranged to slide. The plunger 59 is provided with rack teeth 60 which mesh with the gear teeth 40 of the shaft 38 and a coil spring 61 pocketed in an axial opening 62 in the plunger with its opposite end engaging the inner end of the bore 58 acts to slide said plunger toward the right, as viewed in Fig. 2, to rotate the shaft 38 in a direction to normally maintain the valve members 47 and 48 in open position. The plunger 59 constitutes a dash-pot member and its sliding movement is resisted by the passage of fluid through a restricted aperture 64 in the wall of the valve body 6 between the bore 58 and the passage 22. The dash-pot plunger 59 thus serves as a damping means for absorbing vibrational oscillation of the shaft 38 and for preventing fluttering of the valve members 47 and 48 in addition to resisting closing of said valve members. As an alternative construction the plunger 59 may be loosely fitted in the bore 58 to permit the passage of fluid from the system to the opposite ends of the plunger to cause the fluid to serve as the damping means. The damping action of the fluid will be proportionate to the viscosity of the fluid.

The rod 57 has its inner end disposed within the bore 58 and is provided with a flange 66 adapted to abut against the inner end of said bore to prevent withdrawal of the rod from the valve body 6. The rod 57 projects outwardly beyond the valve body 6 and has a head 67 thereon. Surrounding the projecting end of the rod 57 with its ends engaging the body 6 and the head 67 is a coil spring 68 which normally maintains the rod in its outermost position with the flange 66 abutting the inner end of the bore 58 as shown in Fig. 2. When it is desired to reset the valve members 47 and 48, that is to unseat the valve members to clear the lines of air or obstructions, or test the lines, the rod 57 is depressed to cause its flange 66 to engage the inner end of the dash-pot plunger 59 to slide the plunger toward the right as viewed in Fig. 2, whereby to rotate the shaft 38 in a direction to unseat the valve members, the force applied against the plunger being augmented by the spring 61.

My improved automatic shut-off valve may be applied to use in many fluid systems, Fig. 1 of the drawing illustrating it as incorporated in the cooling system of a water cooled aircraft engine. When connected in such a cooling system the shut-off valve may be used in conjunction with a selector valve, indicated generally by the reference character 70 in Fig. 1. The selector valve 70 may comprise a cylindrical valve body 71 having a longitudinal bore 72 in which a valving member 73 is adapted to slide. The valving member 73 is peripherally grooved at spaced intervals to provide heads 75, 76, 77, and 78 with annular openings 79, 80, and 81 therebetween. A spring 83 disposed within the bore 72 engages an end of the valving member 73 to normally force the member to the position shown by full lines in Fig. 1. With the valving member 73 in this position, the fluid normally is adapted to flow from the return outlet port 24, through the opening 81 and into the line 27 to be returned to the engine 26 for cooling purposes. After absorbing heat in the engine 26, the fluid is forced by the pump 14 through the line 13, passage 12, primary inlet port 9, primary outlet port 10 and line 15 to the radiator 16. The after-cooler 85 of the airplane has its inlet and outlet ports 86 and 87 joined to the selector valve 70 and normally in fluid communication with the openings 80 and 79 respectively. Also normally communicating with the openings 79 and 80 are the inlet and outlet ports 89 and 90 of an after-cooler radiator 91. In Fig. 1, the means connecting the valve members 47 and 48 for simultaneous movement to open and closed positions is diagrammatically indicated by the dotted line 92, it being understood that this means consists of the shaft 38 and related parts, previously described.

My improved automatic shut-off valve shown in Figs. 1 to 3, inclusive, operates in the following manner: Assuming that the engine 26 has been inoperative, the valve members 47 and 48 will be maintained in open position by the dash-pot plunger 59 which is held depressed by the spring 61, the plunger acting through the shaft to slide the valve members toward the left as viewed in Fig. 2 to withdraw their poppets 50 and 51 from engagement with the valve seats 52 and 53. When the engine 26 is started its pump 14 will act to draw coolant fluid from the engine block and force it through the line 13, passage 12, primary inlet port 9, primary outlet port 10 and line 15 into the main engine radiator 16. When the radiator 16 is not completely filled with fluid the return flow of fluid therefrom will be temporarily delayed and during this interval of time the flow of fluid through the primary passage 8 will exceed the flow through the return passage 22. Due to this unbalanced flow the valve member 47 will be moved toward the right, as viewed in Fig. 2, to engage the seat 52 to close the primary passage 8. With the passage 8 thus closed, continued pumping of the fluid will cause pressure to be developed in the inlet passage 12 and duct 17. This pressure, acting against the end of the piston 30 will force the latter toward the right, thus expelling fluid from the cylinder and forcing it into the primary outlet port 10. During this movement of the piston 30, fluid pressure will be built up within the primary outlet port 10, line 15, radiator 16 and line 28 and thus the valve 48 will be shifted toward the left. Since the valve 48 is operatively connected to the valve 47, the latter will also be moved to open position. The piston 30 will continue to move until all the fluid in the cylinder 7 has been discharged into the primary outlet port 10. During the period of time in which the piston member 30 moves in this direction, flow of fluid will be established in the return line 28 and return passage 22 and this flow will react against the valve head 51 to open the valve member 48, thus permitting return flow through the opening 81 of the selector valve 70 and the line 27 to the engine. Assuming that the rate of flow of fluid through the primary and return passages 8 and 22 is equal, the hydraulic forces on the valve members 47 and 48 will be in equilibrium and the spring 61 will cause the valves to remain open. Normal flow having thus been established, the pressure in the primary inlet and outlet ports will be equal and the spring 32 will return the piston 30 to initial position to cause fluid to be drawn into the cylinder.

As explained above, when the rate of flow of fluid through the primary and return passages 8 and 22 is equal, the cooling fluid is adapted to be drawn from the engine 26 and circulated through the radiator 16 in the usual manner. However, should a leak occur in the lines 15 or 28 or in the radiator 16 the rate of flow through the return passage 22 will become less than the rate of flow through the primary passage 8 and when this condition exists the valve members 47 and 48 will become unbalanced and the valve member 47 will respond to the greater flow through the primary passage 8 to seat on the valve seat 52 to prevent further flow of fluid to the radiator 16. Closing the valve member 47 will cause simultaneous closing of the valve member 48.

After the valve member 47 has closed to disrupt the flow of fluid to the radiator, fluid pressure will be developed within the primary passage 8 and passage 12 by the engine pump 14. As before explained, this pressure actuates the piston 30 in an effort to establish normal flow but since normal return flow is impossible, due to leakage, the valve members 47 and 48 will not open before the piston reaches the end of its operative stroke. It is apparent therefore, that the piston will remain in this position due to pressure in the cylinder 7 and it is also evident that this pressure will act against the end of the valving member 73 to shift the latter downwardly in the bore 72 of the valve body 71 against the action of the spring 83. During this shifting movement of the valving member 73 any fluid present in the lower end of the bore 72 will be discharged through a conduit 93 which is connected to the duct 19.

When the valving member 73 of the selector valve 70 is shifted downwardly, its spaced heads 75, 76, 77, and 78 will assume the positions indicated by dotted lines. The inlet and outlet ports 86 and 87 of the after-cooler 85 are thus isolated between the heads 75 and 76 and circulation of fluid between the after-cooler and after-cooler radiator 91 is disrupted. At the same time fluid flow is established through the passage 12, upper end of the bore 72 and port 89 to the after-cooler radiator 91. Likewise, fluid flow is established through the port 90, bore 72 and line 27 to the engine 26 so that the after-cooler radiator 91 serves as a substitute for the main radiator 16 and the engine coolant fluid is cooled during its circulation therethrough. The parts of the shut-off valve 5 and its associated selector valve 70 will remain in the positions just explained so long as the engine pump continues to circulate coolant fluid.

After the aircraft has landed and its engine stopped, the leak in the cooling system may be repaired so that the engine radiator 16 may again be used. After the engine is stopped, the parts of the shut-off valve 5 and selector valve 70 will assume the positions shown by full lines in Fig. 1 due to the absence of pressure in the system. After the leak has been repaired and the engine 26 started, the piston 30 will act to unseat the valve members 47 and 48 to establish flow through the primary and return passages 8 and 22 in the manner previously explained. It is apparent, therefore, that my improved automatic shut-off valve, when used with a selector valve and connected in a cooling system including an auxiliary radiator, serves to disrupt the flow of fluid through the main radiator to prevent loss of fluid and also functions to divert the flow of said fluid through the auxiliary radiator so that the engine may continue to operate.

It will be understood that a metering device which is adapted to permit flow of a predetermined amount of fluid may be substituted for the displacement cylinder 7. It is also within the concept of my invention to provide a by-pass connected between the cylinder (or metering device) and the return line 27 to divert the flow of fluid from the passage 12 to the line 27 after the shut-off valve 5 has closed.

Referring now to Fig. 4, the alternative shut-off valve 100 comprises a valve body 101 provided with a primary fluid passage 102 including a primary inlet port 103 and a primary outlet port 104. The body 101 is also provided with a return passage 105 including a return inlet port 106 and a return outlet port 107. Preferably formed integral with the body 101 is a circular wall 108 defining a cylinder 109, and ports 110 and 111 lead from opposite ends of the cylinder to communicate with the primary inlet and outlet ports 103 and 104, respectively. A hollow piston member 113 is arranged to slide vertically in the cylinder 109 and is normally held in elevated position by a coil spring 114. An outlet port 115 in the wall 108 of the cylinder 109 is normally closed by the side of the piston member 113 when the latter is disposed adjacent the upper end of said cylinder. A by-pass conduit 117 is connected between the port 115 and the return outlet port 107 for a purpose to be later explained.

As shown in the drawing, the primary and return passages 102 and 105 are provided with offset portions or orifices 119 and 120 and surrounding these orifices the walls of the valve body 101 are formed with annular valve seats 121 and 122. The partition wall 123 between the two passages 102 and 105 is provided with a boss 124 having a bore in which a tubular valve stem 125 is adapted to slide. One end of the valve stem 125 extends into the primary inlet port 103 and is provided with a valve head or poppet 126 adapted to close against the valve seat 121. The other end of the tubular valve stem 125 is disposed within a slide bearing 128 formed on the inner surface of the valve body 101 within the return inlet port 106. The stem 125 is normally urged toward the left by a coil spring 129 surrounding the stem between the boss 124 and the head 126, movement of the stem in this direction being limited by the engagement of a collar 130 fast on the stem and normally abutting the opposite end of the boss 124. A head or poppet 132 is slidably mounted on the valve stem 125 between the collar 130 and the valve seat 122 and is adapted to close against the valve seat 122 for a purpose to be later explained.

While the automatic shut-off valve illustrated in Fig. 4 may be used in various fluid systems it has been found to be especially useful in an engine cooling system such as that previously referred to. When the valve is connected in an engine cooling system the primary inlet port 103 receives coolant fluid from the engine pump (not shown) and the fluid is discharged through the primary outlet port 104 to enter the engine radiator (not shown). After passing through the radiator the fluid normally flows into the return inlet port 106 and discharges through the return outlet port 107 into the engine for recirculation by the pump. As in the automatic shut-off valve shown in Figs. 1 to 3, the alternative valve 100 is adapted to automatically shut off the flow of fluid through the primary passage 102 when the rate of fluid flow through the return passage 105 becomes less than the flow through the primary passage 102, due to leakage in the radiator or the fluid lines.

Assuming that fluid is being pumped through the primary passage 102 to a radiator and that the fluid is being returned to said pumping means by way of return passage 105, if the rate of flow through the passages is equal then the valve heads or poppets 126 and 132 will be spaced from their respective seats 121 and 122 as shown in Fig. 4. In other words, the force of the fluid applied against the poppet 126 is equal to the force applied against the poppet 132, it being noted the fluid will flow through the tubular stem 125 to exert equal force against both ends of the stem. If desired, the longitudinal opening in the stem may be restricted in diameter to effect a dash-pot action for preventing valve flutter. By arranging the poppet 132 to slide on the stem 125, when poppet 126 is closed against its seat 121, poppet 132 may move slightly to adjust itself to the seat 122.

Under a desired condition of operation the force acting on poppet 132 tending to move the same toward the left would very slightly overbalance the force tending to move the poppet 126 toward the right, the fluid force against each poppet being equal and the very slight overbalance being effected by the spring 129. If a leak should occur in the system, less fluid would return through the return passage 105 than entered the primary passage 102 and the force acting to move the poppets toward the left would decrease due to the decreased rate of flow through the passage 105. Since the force acting to move the poppet 126 toward the right remains at its previous value an unbalanced condition would exist and the poppet 126 would be forced against its seat 121 to close the primary passage 102. As the poppet 126 approaches the seat 121 a reduced pressure area would occur at the right of the orifice 119 due to throttling of the fluid and a Venturi effect so that this poppet would snap shut against the action of the spring 129. Simultaneous with the closing of the poppet 126, the poppet 132 is engaged by the collar 130 and moved to the right to close against the seat 122.

Pressure developed in the primary inlet port 103 and port 110, due to continued operation of the engine pump, will act to force the piston member 113 downwardly in the cylinder to discharge fluid from the lower end of said cylinder into the primary outlet port 104 from which point it will be forced into the system to discharge through the leak. As the piston member 113 descends it eventually uncovers the port 115 to permit the fluid to pass through the conduit 117 into the return outlet port 107 which, as previously explained, is connected to the suction side of the circulating pump. If desired, an auxiliary cooling radiator could be interposed in the line or conduit 117 so that the coolant fluid would continue to be cooled. It is apparent from the above that the shut-off valve 100, shown in Fig. 4, functions automatically to prevent flow of fluid to a radiator or other device when a leak occurs in the system which the device is incorporated.

It will be observed from the foregoing that my invention provides a particularly simple, yet highly efficient valve for shutting off the flow of fluid being supplied to a device if a leak should occur in the fluid system. The improved shut-off valve is entirely automatic in operation and requires little or no attention except to periodically check its operation. The valve may be advantageously employed in many fluid systems and is particularly adapted for use in the hydraulic actuating systems and engine cooling systems of military aircraft wherein the fluid lines are subjected to gun fire and apt to become damaged from other causes.

While my improved automatic shut-off valve has been herein shown and described as embodied in two preferred forms of construction by way of example, it is to be understood that various changes may be made in its construction and in the manner of applying it to use without departing from the spirit of the invention and I therefore reserve the right to all such changes as properly come within the scope of the appended claims.

I claim as my invention:

1. In an engine cooling system including a main radiator and a pump for circulating coolant from an engine through a line to said radiator and back through a conduit to said engine, the combination of: an automatic shut-off valve in said system; an automatic selector valve in said system; and an auxiliary radiator, said shut-off valve being responsive to a normal rate of flow of fluid through said conduit to permit the flow of fluid from said pump to said main radiator and responsive to a decrease in the rate of flow of fluid through said conduit to shut off the flow of fluid from said pump to said main radiator, and said selector valve being actuated by fluid pressure developed in said line when said shut-off valve is closed to divert the flow of fluid from said line to said auxiliary radiator; and means for directing the flow of fluid back to said engine for recirculation.

2. In a hydraulic system including a device to be hydraulically actuated and a fluid circulating pump for supplying fluid through a line to said device and returning it back through a conduit to said pump, the combination of: an automatic shut-off valve connected in said system and through which the supply and return flow of fluid passes, said shut-off valve being responsive to normal rate of flow through said conduit to permit the flow of said fluid through said line and responsive to a decrease in the rate of flow in said conduit to close said line to prevent flow from said pump to said device; an auxiliary device; selector valve means connected between said shut-off valve and said auxiliary device, said selector valve being actuated by pressure developed in said line due to closing of said shut-off valve to divert the flow of fluid through said auxiliary device; and means for directing the flow of fluid from said auxiliary device back to said pump.

3. In a hydraulic system including a device to be hydraulically actuated and a fluid circulating pump for supplying fluid through a line to said device and returning it back through a conduit to said pump, the combination of: an automatic shut-off valve connected in said system and through which the supply and return flow of fluid passes, said shut-off valve being responsive to normal rate of flow through said conduit to permit the flow of said fluid through said line and responsive to a decrease in the rate of flow in said conduit to close said line to prevent flow from said pump to said device; and by-pass means for diverting the flow of said fluid from said line to said conduit after said shut-off valve has closed said line.

4. In a hydraulic system including a device to be hydraulically actuated and a fluid circulating pump for supplying fluid through a line to said device and returning it back through a conduit to said pump, the combination of: an automatic shut-off valve connected in said system and through which the supply and return flow of fluid passes, said shut-off valve being responsive to normal rate of flow through said conduit to permit the flow of said fluid through said line and responsive to a decrease in the rate of flow in said conduit to close said line to prevent flow from said pump to said device; and by-pass means responsive to closing of said valve for diverting the flow of said fluid from said line to said conduit.

5. In a fluid circulating system including a device adapted to contain fluid, a pump for supplying fluid through a line to said device and a conduit for returning fluid from said device to said pump, an automatic shut-off valve connected in said system and through which the supply and return flow of fluid passes, said shut-off valve being responsive to normal rate of flow of said fluid through said conduit to permit the flow of said fluid through said line and responsive to a decrease in the rate of flow of said fluid in said conduit to close said line to prevent flow of said fluid from said pump to said device.

6. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means in said primary passage and movable downstream in said primary passage into engagement with said primary valve seat by flow through said primary passage from said primary inlet port toward said primary outlet port so as to close said primary passage; flow-responsive return valve means in said return passage and movable downstream in said return passage out of engagement with said return valve seat by flow in said return passage from said return inlet port toward said return outlet port so as to open said return passage; and means connecting said primary and return valve means for simultaneous movement toward and away from said primary and return valve seats, respectively, both of said valve means being spaced from said valve seats, respectively, as long as the rate of flow through said primary passage exceeds the rate of flow through said return passage by less than a predetermined amount, both of said valve means being moved into engagement with said valve seats, respectively, to close both of said passages when the rate of flow through said primary passage exceeds the rate of flow through said return passage by more than said predetermined amount, said means connecting said primary and return valve means including a shaft rotatably mounted in said valve body and provided with gear teeth in mesh with gear teeth on each of said valve means, said shaft serving to convert movement of one of said valve means toward and away from its valve seat into movement of the other of said valve means toward and away from its valve seat, respectively, so as to effect simultaneous movement and closing movement of said valve means.

7. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means in said primary passage and movable downstream in said primary passage into engagement with said primary valve seat by flow through said primary passage from said primary inlet port toward said primary outlet port so as to close said primary passage; flow-responsive return valve means in said return passage and movable downstream in said return passage out of engagement with said return valve seat by flow in said return passage from said return inlet port toward said return outlet port so as to open said return passage; and a shaft rotatable in said valve body and provided with two sets of gear teeth thereon, said primary and return valve means being mounted in said valve body for slidable movement toward and away from said primary and return valve seats, respectively, and being provided with rack teeth thereon respectively meshing with said sets of gear teeth on said shaft, whereby sliding movement of said primary valve means toward and away from said primary valve seat produces sliding movement of said return valve means toward and away from said return valve seat, respectively, said primary valve means being slidable toward said primary valve seat by flow through said primary passage from said primary inlet port toward said primary outlet port whenever the rate of flow through said primary passage exceeds the rate of flow through said return passage by more than a predetermined amount.

8. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means in said primary passage and movable downstream in said primary passage into engagement with said primary valve seat by flow through said primary passage from said primary inlet port toward said primary outlet port so as to close said primary passage; flow-responsive return valve means in said return passage and movable downstream in said return passage out of engagement with said return valve seat by flow in said return passage from said return inlet port toward said return outlet port so as to open said return passage, each of said valve means being provided with rack teeth; and a shaft rotatable in said body and having gear teeth meshing with said rack teeth of each valve means, said valve means being spaced from their respective seats during substantially equal rates of flow of fluid through said primary and return passages and said valve means in said primary passage acting in response to a rate of flow through said primary passage in excess of the rate of flow through said return passage by a predetermined amount to close said primary passage, such closing action being transmitted by said shaft to the other of said valve means to effect substantially simultaneous closing of said return passage.

9. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means slidably mounted in said valve body and movable downstream in said primary passage into engagement with said primary valve seat by flow through said primary passage from said primary inlet port toward said primary outlet port, said primary valve means being provided with rack teeth; flow-responsive return valve means slidably mounted in said valve body and movable downstream in said return passage out of engagement with said return valve seat by flow through said return passage from said return inlet port toward said return outlet port, said return valve means being provided with rack teeth; means connecting said primary and return valve means for converting opening and closing movement of one of said valve means into corresponding movements of the other of said valve means, whereby said primary valve means is moved toward said primary valve seat and moves said return valve means toward said return valve seat whenever the rate of flow through said primary passage from said primary inlet port to said primary outlet port exceeds the rate of flow through said return passage from said return inlet port toward said return outlet port by more than predetermined amount, said connecting means including a shaft rotatably mounted in said valve body and having two sets of gear teeth respectively meshing with said rack teeth on said primary and return valve means; and vibration-absorbing means engageable with said shaft for reducing vibrational oscillations thereof to prevent fluctuations of said valve means and to damp the closing movements of said valve means.

10. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means slidably mounted in said valve body and movable downstream in said primary passage into engagement with said primary valve seat by flow through said primary passage from said primary inlet port toward said primary outlet port, said primary valve means being provided with rack teeth; flow-responsive return valve means slidably mounted in said valve body and movable downstream in said return passage out of engagement with said return valve seat by flow through said return passage from said return inlet port toward said return outlet port, said return valve means being provided with rack teeth; means connecting said primary and return valve means for converting opening and closing movement of one of said valve means into corresponding movements of the other of said valve means, whereby said primary valve means is moved into engagement with said primary valve seat and moves said return valve means into engagement with said return valve seat whenever the rate of flow through said primary passage from said primary inlet port to said primary outlet port exceeds the rate of flow through said return passage from said return inlet port toward said return outlet port by more than a predetermined amount, said connecting means including a shaft rotatably mounted in said valve body and having two sets of gear teeth respectively meshing with said rack teeth on said primary and return valve means; and a plunger slidable in a bore in said valve body and having rack teeth in mesh with a third set of rack teeth on said shaft.

11. An automatic shut-off valve as defined in claim 10 including a restricted opening in said valve body communicating between said bore and one of said passages, whereby said plunger, said bore and restricted opening cooperate to provide a dash-pot means, said device further including resilient means within said bore and engaging said plunger for urging said plunger in a direction to resist closing of said primary and return valve means.

12. An automatic shut-off valve as defined in claim 11 including a manually slidable rod carried by said valve body and engaging said plunger for opening said primary and return valve means.

13. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means in said primary passage and movable downstream in said primary passage into engagement with said primary valve seat by flow through said primary passage from said primary inlet port toward said primary outlet port so as to close said primary passage; flow-responsive return valve means in said return passage and movable downstream in said return passage out of engagement with said return valve seat by flow in said return passage from said return inlet port toward said return outlet port so as to open said return passage; means connecting said primary and return valve means for simultaneous movement toward and away from said primary and return valve seats, respectively, both of said valve means being spaced from said valve seats, respectively, as long as the rate of flow through said primary passage exceeds the rate of flow through said return passage by less than a predetermined amount, both of said valve means being moved into engagement with said valve seats, respectively, to close both of said passages when the rate of flow through said primary passage exceeds the rate of flow through said return passage by more than said predetermined amount; a cylinder carried by said valve body and communicating at one end with said primary passage upstream from said primary valve seat and communicating at its other end with said primary passage downstream from said primary valve seat; and piston means in said cylinder, said piston means being movable in said cylinder by fluid under pressure in said primary passage upstream from said primary valve seat to force fluid from said cylinder into said primary passage downstream from said primary valve seat so as to produce flow through said return passage from said return inlet port toward said return outlet port when said return inlet port is connected to said primary outlet port, whereby to produce opening movement of both of said valve means.

14. An automatic shut-off valve as defined in claim 13 including means for returning said piston means toward said one end of said cylinder when the fluid pressures in said primary passage upstream and downstream from said primary valve seat become substantially equal upon opening of said primary valve means.

15. An automatic shut-off valve according to claim 14 wherein the means last defined includes a compression spring disposed in said cylinder with one end of said spring in engagement with said piston means and with the other end of said spring in engagement with said other end of said cylinder.

16. An automatic shut-off valve as defined in claim 13 wherein said cylinder is also provided with an outlet orifice adjacent said one end thereof, said piston means closing said outlet orifice when it is adjacent said one end of said cylinder, said automatic shut-off valve including a conduit connecting said orifice and said return outlet port.

17. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means in said primary passage and movable downstream in said primary passage into engagement with said primary valve seat by flow through said primary passage from said primary inlet port toward said primary outlet port so as to close said primary passage; flow-responsive return valve means in said return passage and movable downstream in said return passage out of engagement with said return valve seat by flow in said return passage from said return inlet port toward said return outlet port so as to open said return passage; means connecting said primary and return valve means for simultaneous movement toward and away from said primary and return valve seats, respectively, both of said valve means being spaced from said valve seats, respectively, as long as the rate of flow through said primary passage exceeds the rate of flow through said return passage by less than a predetermined amount, both of said valve means being moved into engagement with said valve seats, respectively, to close both of said passages when the rate of flow through said primary passage exceeds the rate of flow through said return passage by more than said predetermined amount; a cylinder carried by said valve body and communicating at one end with said primary passage upstream from said primary valve seat and communicating at its other end with said primary passage downstream from said primary valve seat; piston means in said cylinder, said piston means being movable in said cylinder by fluid under pressure in said primary passage upstream from said primary valve seat to force fluid from said cylinder into said primary passage downstream from said primary valve seat so as to produce flow through said return passage from said return inlet port toward said return outlet port when said return inlet port is connected to said primary outlet port, whereby to produce opening movement of both of said valve means; and resilient means operatively connected to said primary and return valve means for biasing said valve means toward their respective open positions, whereby the rate of flow through said primary passage toward said primary outlet port must exceed the rate of flow through said return passage toward said return outlet port by more than a predetermined amount before movements of said valve means toward their respective seats can occur.

18. An automatic shut-off valve as defined in claim 17 including auxiliary manually operable means operatively connected to said primary and return valve means for unseating said valve means.

19. An automatic shut-off valve including: a valve body provided with a primary passage having a primary inlet port and a primary outlet port and provided with a return passage having a return inlet port and a return outlet port, said return inlet port being connectible to said primary outlet port to provide for fluid flow through said primary passage from said primary inlet port to said primary outlet port and subsequently through said return passage from said return inlet port to said return outlet port, said valve body being provided with primary and return valve seats in said primary and return passages, respectively; flow-responsive primary valve means in said primary passage and movable downstream in said primary passage into engagement with said primary valve seat by flow through said primary passage from said primary inlet port toward said primary outlet port so as to close said primary passage; flow-responsive return valve means in said return passage and movable downstream in said return passage out of engagement with said return valve seat by flow in said return passage from said return inlet port toward said return outlet port so as to open said return passage; means connecting said primary and return valve means for simultaneous movement toward and away from said primary and return valve seats, respectively, both of said valve means being spaced from said valve seats, respectively, as long as the rate of flow through said primary passage exceeds the rate of flow through said return passage by less than a predetermined amount, both of said valve means being moved into engagement with said valve seats, respectively, to close both of said passages when the rate of flow through said primary passage exceeds the rate of flow through said return passage by more than said predetermined amount; and metering means communicating with said primary passage downstream from said primary valve seat for delivering a predetermined amount of fluid into said primary passage downstream from said primary valve seat so as to establish flow through said return passage from said return inlet port toward said return outlet port when said return inlet port is connected to said primary outlet port, whereby such flow through said return passage produces opening movements of said primary and return valve means.

20. An automatic shut-off valve according to caim 19 including means operatively connected to said valve means for damping vibration of said valve means to prevent flutter thereof.

21. An automatic shut-off valve according to claim 19 including resilient means carried by said valve body and operatively connected to said primary and return valve means for biasing said primary and return valve means toward their respective open positions so that the rate of flow through said primary passage from said primary inlet port toward said primary outlet port must exceed the rate of flow through said return passage from said return inlet port toward said return outlet port by more than a predetermined amount before closing movements of said valve means can occur.

22. An automatic shut-off valve as set forth in claim 19 wherein said primary and return passages are separated by a wall, said means connecting said primary and return valve means comprising a member movable in said wall and connected to said primary and return valve means.

23. An automatic shut-off valve as defined in claim 22 including resilient means for biasing said primary and return valve means toward their open positions.

24. An automatic shut-off valve according to claim 22 wherein one of said valve means includes a valve member on said movable member and wherein the other of said valve means includes a valve member slidable on said movable member, said movable member having a collar thereon, said valve member of said other valve means being adapted to seat on said collar.

HOWARD FIELD, Jr.

REFERENCES CITED

The following references are of record in the file of this patent:

UNITED STATES PATENTS

| Number | Name | Date |
|---|---|---|
| 693,133 | Hennebohle | Feb. 11, 1902 |
| 1,481,307 | Stuart | Jan. 24, 1924 |
| 2,204,757 | Henze | June 18, 1940 |
| 2,387,531 | Rose | Oct. 23, 1945 |
| 2,512,189 | Waterman | June 2, 1950 |

FOREIGN PATENTS

| Number | Country | Date |
|---|---|---|
| 669,897 | France | of 1929 |